US009539778B2

(12) United States Patent
Harding et al.

(10) Patent No.: US 9,539,778 B2
(45) Date of Patent: Jan. 10, 2017

(54) PNEUMATIC TIRE AND A PROCESS TO RETREAD A TIRE

(75) Inventors: Antony Harding, Rittman, OH (US); David Charles Wagner, Wadsworth, OH (US); Robert Cornelis van de Pas, Tilburg (NL); Larry Lee Mershon, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1570 days.

(21) Appl. No.: 11/946,087

(22) Filed: Nov. 28, 2007

(65) Prior Publication Data
US 2009/0133796 A1    May 28, 2009

(51) Int. Cl.
| | |
|---|---|
| *B29D 30/54* | (2006.01) |
| *B60C 9/22* | (2006.01) |
| *B60C 9/26* | (2006.01) |
| *B60C 11/02* | (2006.01) |
| *B60C 9/18* | (2006.01) |

(52) U.S. Cl.
CPC ............ *B29D 30/54* (2013.01); *B60C 9/2204* (2013.04); *B60C 9/263* (2013.04); *B60C 11/02* (2013.01); *B29D 2030/544* (2013.01); *B60C 2200/02* (2013.04)

(58) Field of Classification Search
USPC .... 156/96, 117, 128.1, 130; 152/209.6, 531, 152/533
See application file for complete search history.

(56) References Cited

U.S. PATENT DOCUMENTS

| | | | |
|---|---|---|---|
| 3,607,497 A | 9/1971 | Chrobak | 156/95 |
| 3,808,076 A | 4/1974 | Barwell | 156/96 |
| 4,202,394 A | 5/1980 | van der Burg | 152/361 |
| 4,258,775 A | 3/1981 | Samoto | 152/361 |
| 4,838,966 A | 6/1989 | Oswald | 156/117 |
| 5,007,974 A * | 4/1991 | Maathuis et al. | 156/117 |
| 5,088,538 A * | 2/1992 | Navaux | 152/528 |
| 5,162,070 A | 11/1992 | Meyer | 156/500 |

(Continued)

FOREIGN PATENT DOCUMENTS

| | | | |
|---|---|---|---|
| DE | 42 09 818 A1 | 9/1993 | B60C 9/12 |
| EP | 1 574 362 A1 | 9/2005 | B60C 9/22 |

(Continued)

OTHER PUBLICATIONS

European Search Report, completed Mar. 3, 2009.

*Primary Examiner* — Geoffrey L Knable
(74) *Attorney, Agent, or Firm* — June E. Rickey

(57) ABSTRACT

A pneumatic tire and a process to retread a tire is provided. The retreaded tire has a carcass and a crown region, wherein the crown region comprises a belt reinforcement structure located between the carcass and a tread. The retreaded tire further comprises a cementless cushion layer located radially outward of said belt reinforcement structure, and one or more reinforcement plies located radially outward of the cementless cushion layer. The one or more reinforcement plies is formed from a substantially continuous strip of reinforced elastomer which is wound from one side of the crown to the other side in a substantially continuous manner. The reinforcement ply may be formed from spirally winding the strip about the carcass, or one or more reinforcement plies may be formed from winding the strip about the carcass in a zigzag pattern.

6 Claims, 4 Drawing Sheets

(56) References Cited

U.S. PATENT DOCUMENTS

| | | | |
|---|---|---|---|
| 5,226,999 A | 7/1993 | Dugas | 153/344 |
| 5,323,829 A * | 6/1994 | Hubbell et al. | 152/527 |
| 5,342,473 A | 8/1994 | Bibona et al. | 156/394.1 |
| 5,503,940 A | 4/1996 | Majumdar et al. | 428/492 |
| 5,513,685 A | 5/1996 | Watanabe et al. | 152/531 |
| 6,116,311 A | 9/2000 | Ueyoko et al. | 152/531 |
| 6,546,983 B1 * | 4/2003 | Dyer | 152/526 |
| 2005/0194076 A1 * | 9/2005 | Vermaat et al. | 152/209.6 |
| 2005/0211351 A1 * | 9/2005 | Majumdar et al. | 152/154.2 |

FOREIGN PATENT DOCUMENTS

| | | | |
|---|---|---|---|
| EP | 1 579 985 | 9/2005 | B29D 30/52 |
| GB | 810 425 | 3/1959 | |
| JP | 2007-069687 A | 3/2007 | B29D 30/54 |

\* cited by examiner

PNEUMATIC TIRE AND A PROCESS TO RETREAD A TIRE

FIELD OF THE INVENTION

This invention relates to a pneumatic tire such as an aircraft tire or truck tire and processes to manufacture or retread such a tire.

BACKGROUND OF THE INVENTION

Pneumatic tires for high speed applications experience a high degree of flexure in the crown area of the tire as the tire enters and leaves the contact patch. This problem is particularly exacerbated on aircraft tires wherein the tires can reach speed of over 200 mph at takeoff and landing. When a tire spins at very high speeds, the crown area tends to grow in dimension due to the high angular accelerations and velocity tending to pull the tread area radially outwardly. Counteracting these forces is the load of the vehicle, which is only supported in the small area of the tire known as the contact patch.

Aircraft tires typically exhibit excessive wear in the tread portion of the tire, while the carcass portion typically does not. Thus to save money, many aircraft companies choose to retread their aircraft tires in order to extend the service life of the tire. Retread tires tend to flex in the crown area.

It is known in the prior art how to retread tires. Typically, the tread is buffed or sanded down to the buff line, which is typically located in the cushion layer. Next, a precut layer of cushion gum which is sized to a particular tire is applied. Next, two or more layers of precut R/T plies are applied. Then a new tread layer is applied and then the tire is cured in a mold. One disadvantage to the prior art process is that you have to store all of the different components, because the dimensions of the components vary depending upon the tire type and size.

Thus it is desired to have a retread without the need for precut and custom tire components which must be premade and stored prior to assembly onto a tire. It is also desired to have an improved retreaded tire design that eliminates R/T cut ply endings.

SUMMARY OF THE INVENTION

A pneumatic tire is disclosed having a carcass and a crown region, the crown region comprising a crown reinforcement structure and a tread portion, with a radially inner side and a tread on its radially outer side, wherein the crown reinforcement structure is located between the tread portion and the carcass and comprises a continuous layer of a strip of cord reinforced elastomer, wherein the cords are made of a low lase cord.

In further accordance with the invention, a process to retread a pneumatic tire is disclosed, the process comprising the steps of: providing a tire to be retreaded, the tire comprising a tread portion and a carcass, separating the tread portion from the carcass along a buff-line and removing the tread portion, extruding a cushion layer directly onto the tire, and applying a continuous strip of cord reinforced elastomer over the cushion layer to cover the crown portion of the tire, applying a continuous strip of tread rubber over the crown, and then curing the tire in a mold.

DEFINITIONS

"Axial" and "axially" mean lines or directions that are parallel to the axis of rotation of the tire.

"Bias ply tire" or "bias tire" means a tire having a carcass with reinforcing cords in the carcass ply extending diagonally across the tire from bead core to bead core preferably at a 25°-50° angle with respect to the equatorial plane of the tire. Cords run at opposite angles in alternate layers.

"Carcass" means the tire structure apart from the tread reinforcing belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Ply" means a layer of rubber-coated parallel cords.

"Radial" and "radially" mean directions radially toward or away from the axis of rotation of the tire.

"Radial-ply tire" or "radial tire" means a belted or circumferentially-restricted pneumatic tire in which the ply cords which extend from bead to bead are laid at cord angles preferably between 65° and 90° with respect to the equatorial plane of the tire.

DETAILED DESCRIPTION OF THE INVENTION

Figure 1:
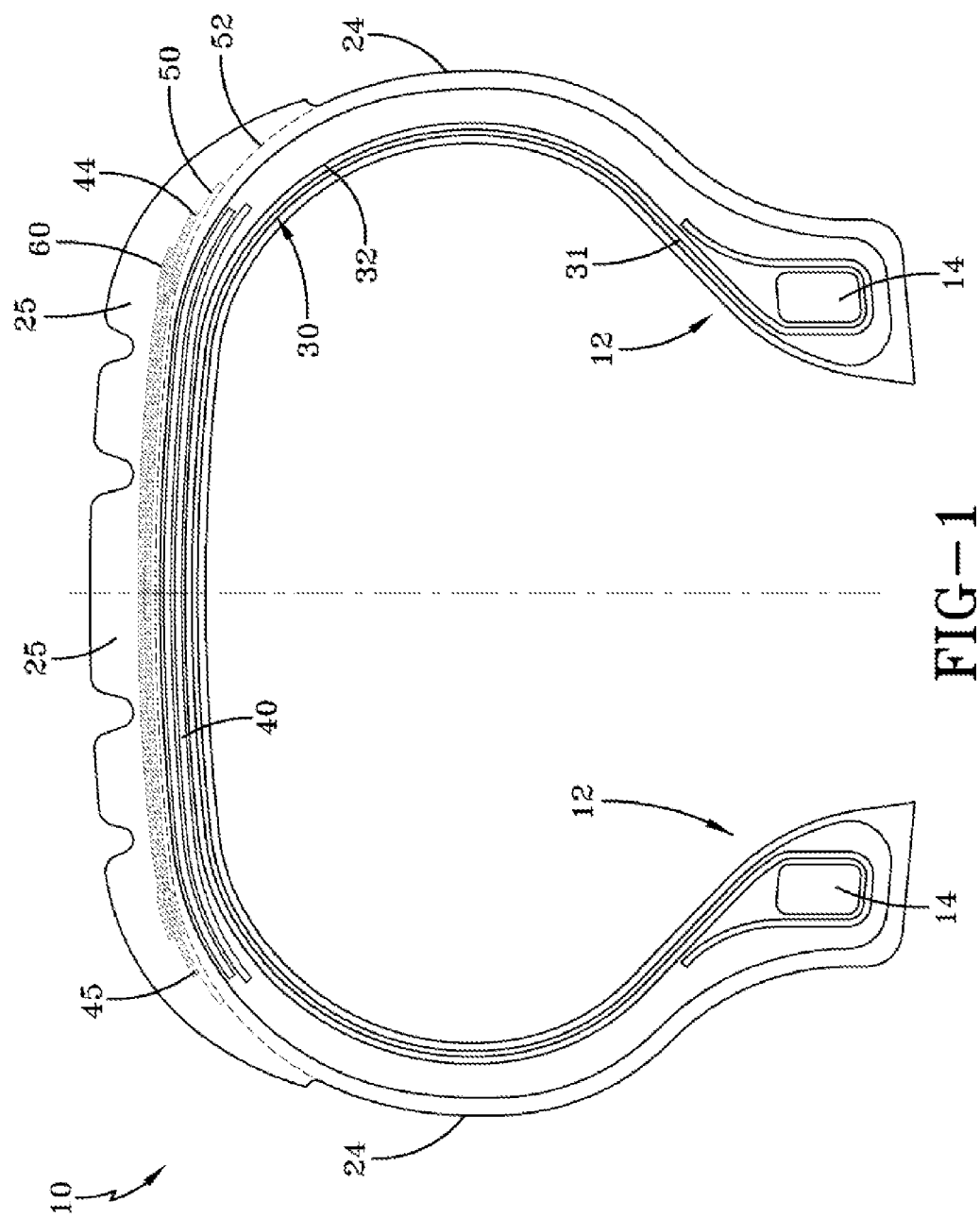
FIG. 1 is a cross-sectional view of a retreaded tire according to the invention.

FIG. 1 shows a cross-sectional view of a retreaded tire 10. The tire 10 may be either a radial or bias tire. The tire 10 comprises two bead portions 12 each containing one or more bead cores 14 embedded therein. A sidewall portion 24 extending radially outward from each of the bead portions, and a tread portion 25 of substantially cylindrical shape extending between the radially outer ends of the sidewall portions 24. Furthermore, the tire 10 comprises a carcass 30 toroidally extending from one of the bead portions to the other bead portion. The carcass 30 is comprised of at least one carcass ply 32, but may comprise a plurality of carcass plies 32. The carcass plies 32 are wound around the bead core to form turnup portions. Each of these carcass plies 32 preferably contains many nylon cords such as nylon-6,6 cords, for example extending substantially perpendicular to an equatorial plane E of the tire 10 (i.e., extending in the radial direction of the tire). A tread rubber 25 is arranged radially outside of the carcass 30.

The tire 10 further comprises a belt layer 40 which reinforces the crown area of the tire. The belt layer 40 is positioned between the carcass 30 and the tread rubber 25. The belt layer 40 may be comprised of a plurality of cut belt layers, zigzag belts or zero degree belts. Located radially outward of the belt layer 40 is a layer of cushion gum 50. The buff line 52 is typically located on the innermost portion of the cushion gum layer 50. The tire further comprises one or more layers of RT ply 60 located radially outward of the cushion gum layer 50. The RT ply is located between the cushion gum 50 and the tread rubber 25.

The tire retread process of the invention includes buffing a tire to be retreaded to remove the tread, RT plies, down to the buff line. Next, a layer of cushion gum is applied to the tire. Preferably, the cushion gum layer is extruded or otherwise applied directly onto the carcass. Preferably, the cushion gum layer comprises a cementless cushion such as described in U.S. Pat. No. 5,503,940 which is hereby incorporated by reference. One example of a solventless adhesive composition suitable for use in the invention includes a mixture of at least one elastomer, at least one tackifier, and at least one bisimide compound of the general formula:

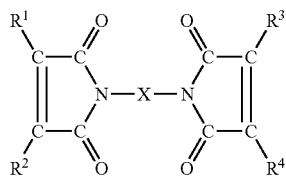

where $R^1$, $R^2$, $R^3$, and $R^4$, independently are hydrogen, an alkyl group having from 1 to 5 carbon atoms, a phenyl group, an alkylphenyl group having 7 to 10 carbon atoms or a halogen substituted alkyl group having from 1 to 5 carbon atoms, a halogen substituted phenyl group, or a halogen substituted alkylphenyl group having a total of from 7 to 10 carbon atoms, and where X is an alkylene group having from 1 to 5 carbon atoms, a phenylene group, an alkylenephenyl or alkylenephenyl group having 7 to 10 carbon atoms or a halogen substituted alkylene having from 1 to 5 carbon atoms, a halogen substituted phenylene group, or a halogen substituted alkylphenylene or alkylenephenyl group having a total of from 7 to 10 carbon atoms.

The cushion layer 50 is applied directly onto the carcass preferably using an extruder. One example of an extruder suitable for use is manufactured by A-Z Formen-und Maschinenbau GmbH, Munchen, Germany and is illustrated in U.S. Pat. No. 6,089,844. Another example of an extruder suitable for applying cushion gum to the carcass is shown in U.S. Pat. No. 5,342,473 to Steelastic. The cushion layer may be applied in strips or may be applied in a single large strip.

Figure 2:
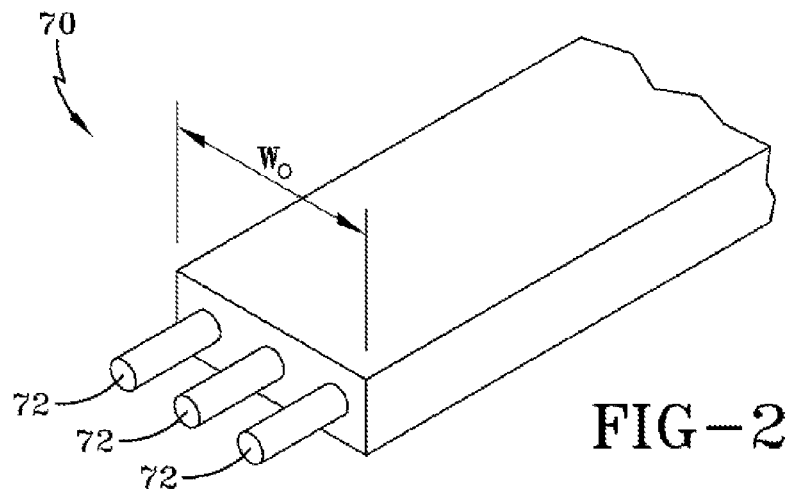
FIG. 2 is a perspective view of a reinforced strip.

After the cushion gum layer 50 is applied to the buffed carcass, next one or more layers of RT ply 60 are applied. The RT ply layer is preferably comprised of a continuous strip 70 of reinforced elastomer, as shown in FIG. 2. Preferably the elastomer is rubber. The strip may comprise one or more cords 72, typically in the range of 1 to 16 cords per strip, and the strip having a width Wo in the range of about 5 mm to about 30 mm. Preferably, the cords are made of nylon 6,6. Preferably the cords are comprised of a low lase cord which allows the cord to stretch as the rubber is cured, preventing the cords from being pulled in a radially downward direction during cure. The low lase cord properties are preferably in the range of about 15 to 50N, with a break strength preferably in the range of about 100 to about 150N. One low lase cord suitable for use with the invention is made of nylon 6,6 and has a 1260/2 denier construction. Another example of a low lase cord suitable for use with the invention is made of nylon 6,6 and has a 840/2 denier construction.

Figure 3:
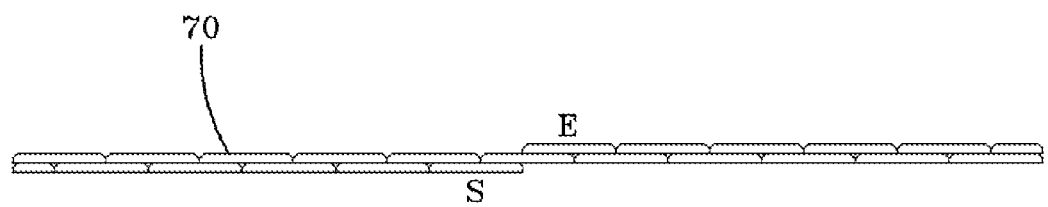
FIG. 3 is a cross-sectional view of a layup of a reinforced strip.
Figure 4:
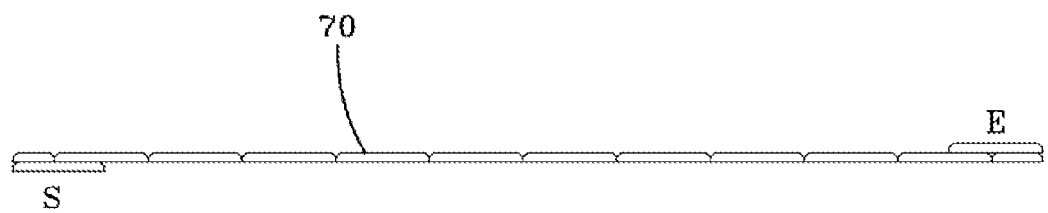
FIG. 4 is a cross-sectional view of a layup of a reinforced strip.

In a first embodiment of the invention, the RT ply layer 60 is formed of a continuous reinforced strip 70 that is spirally wound in a substantially circumferential direction about the tire carcass approximating a "zero degree" layer. See FIG. 5. The layer has no cut ends at the lateral edges 44, 45. The cord angle is in the range of less than 10 degrees and preferably less than 5 degrees to the tire circumferential direction. The strip may be initiated in the centerplane of the carcass, and extend to a first lateral edge 45 and then reversing direction to extend to a second lateral edge 44, as shown in FIG. 3. Alternatively, the strip may start at one end 44 and progress to the other end 45 as shown in FIG. 4, with an overlap of the cords at the edges.

It is preferred that the strip be comprised of a low lase cord made of nylon or nylon 6,6 and have an 840/2 denier construction. The strips are located adjacent one another and may be spaced with a gap between the windings, or alternatively, the strip windings may be overlapped.

The spirally wound circumferential layer 60 with no cut cord endings, by resisting growth in the crown area of the tire, reduces the cut propensity due to foreign object damage. This means the tire's high-speed durability is enhanced.

Figure 6:
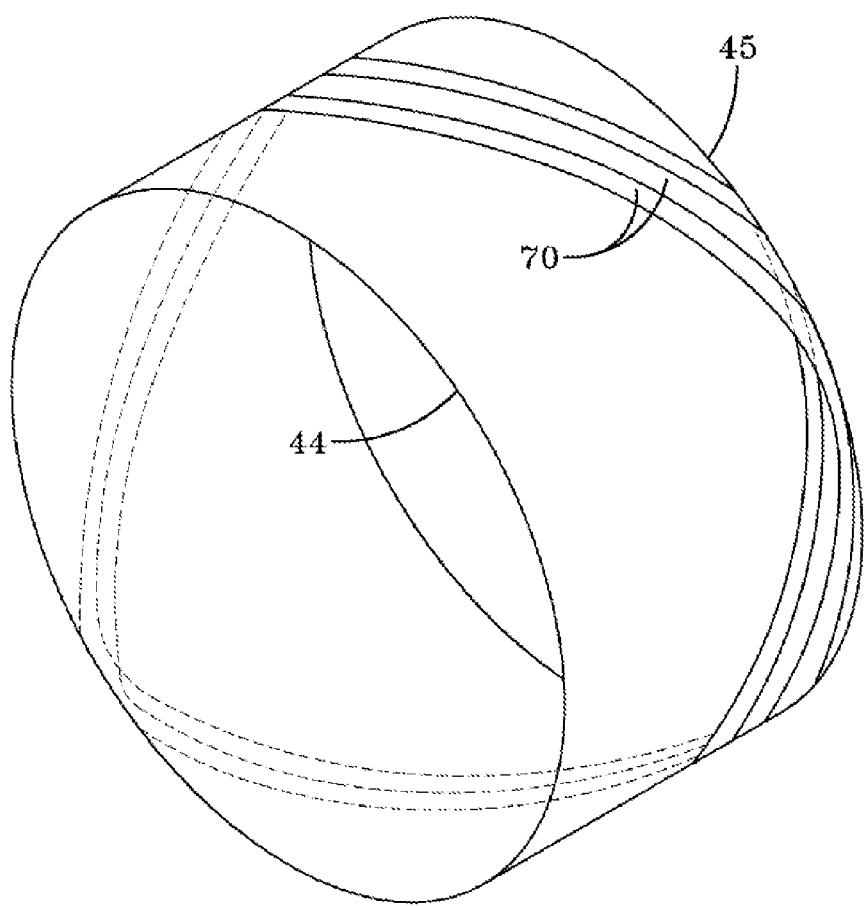
FIG. 6 is a perspective view of a schematic illustrating layup of a strip in a zigzag manner.

In a second embodiment of the invention an RT ply layer 80 is formed in a zigzag configuration, as shown in FIG. 6. In the zigzag configuration, the continuous strip 70 is wound from lateral edge 44 to lateral edge 45, repeating the side to side winding throughout the circumference of the tire in a zigzag manner as shown in FIG. 6. The zigzag winding is continued, shifting the strip slightly per revolution so that either the strips abut or they overlap the adjacent strip windings 73. As a result, the strip windings 73 extend substantially zigzag in the circumferential direction while changing the bending direction at both side ends 44, 45. At the side edges 44, 45 it is desired that the strip is angled slightly so that R/W (radius of curvature/strip width) is not less than 2 in order to reduce strain at the edges.

Figure 5:
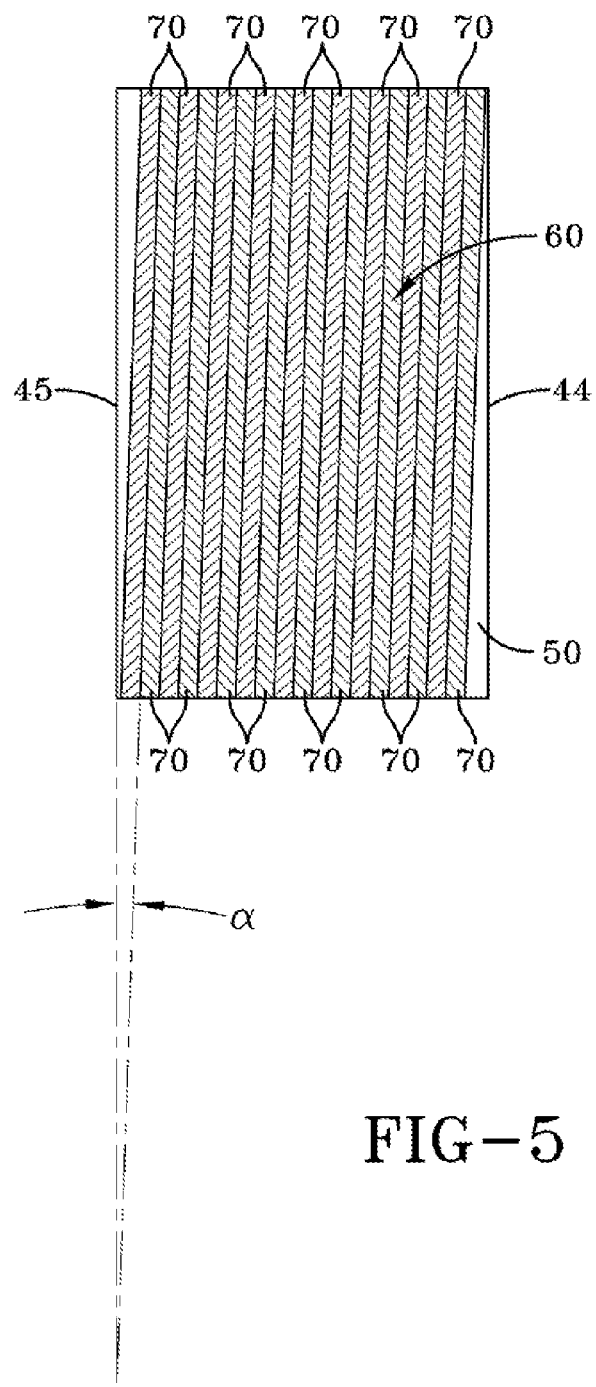
FIG. 5 is a partially cutaway top view of a crown portion of the tire shown in FIG. 1 showing the lay-up of the strip.

The angle of inclination θ of the zigzag strip relative to the carcass center plane, as shown in FIG. 5, varies typically in the range of about 5 to about 35 degrees, and more particularly in the range of about 10 to about 20 degrees.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for retreading a pneumatic tire, the process comprising the steps of: (1) providing a tire to be retreaded, the tire comprising a tread portion and a carcass, (2) removing the tread from the carcass, (3) extruding a layer of cushion directly onto the tire carcass; (4) forming a reinforcement layer over the cushion layer by continuously winding a reinforced strip of elastomer directly onto the cushion layer from one side of the crown portion of the tire to the other side; wherein the reinforced strip has one or more reinforcement cords, applying a tread over said reinforcement layer, and vulcanizing the assembly in a mold, thereby forming a retreaded tire.

2. The process of claim 1 wherein the cushion is made from a mixture of at least one elastomer, at least one tackifier, and at least one bisimide compound of the general formula:

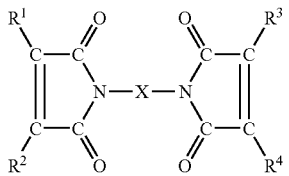

where $R^1$, $R^2$, $R^3$, and $R^4$, independently are hydrogen, an alkyl group having from 1 to 5 carbon atoms, a phenyl group, an alkylphenyl group having 7 to 10 carbon atoms or a halogen substituted alkyl group having from 1 to 5 carbon atoms, a halogen substituted phenyl group, or a halogen substituted alkylphenyl group having a total of from 7 to 10 carbon atoms, and where X is an alkylene group having from 1 to 5 carbon atoms, a phenylene group, an alkylphenylene or alkylenephenyl group having 7 to 10 carbon atoms or a halogen substituted alkylene having from 1 to 5 carbon atoms, a halogen substituted phenylene group, or a halogen substituted alkylphenylene or alkylenephenyl group having a total of from 7 to 10 carbon atoms.

3. The method of claim 1 wherein the reinforced strip is wound about the carcass in a zigzag pattern.

4. The method of claim 1 wherein the reinforced strip is wound about the carcass in a spiral pattern.

5. The method of claim 1 wherein the strip comprises nylon cord having a cord construction of 840/2 denier.

6. The method of claim 1 wherein the strip comprises nylon cord having a cord construction of 1260/2 denier.

\* \* \* \* \*